United States Patent
Jeyabalan et al.

(10) Patent No.: US 10,774,909 B2
(45) Date of Patent: Sep. 15, 2020

(54) METHOD FOR MAKING TURBINE WHEEL OF HYDROKINETIC TORQUE CONVERTER

(71) Applicant: VALEO KAPEC CO., LTD., Daegu (KR)

(72) Inventors: Subramanian Jeyabalan, Troy, MI (US); Alexandre Depraete, Bloomfield, MI (US); Jean-François Bisson, Créteil (FR); David Salvadori, Le Mesnil En Thelle (FR); Adrien Peduzzi, Les Ulis (FR)

(73) Assignee: Valeo Kapec Co., Ltd., Daegu (KR)

( * ) Notice: Subject to any disclaimer, the term of this patent is extended or adjusted under 35 U.S.C. 154(b) by 7 days.

(21) Appl. No.: 15/938,878

(22) Filed: Mar. 28, 2018

(65) Prior Publication Data
US 2019/0301578 A1    Oct. 3, 2019

(51) Int. Cl.
| | |
|---|---|
| *G01M 1/14* | (2006.01) |
| *G01M 1/34* | (2006.01) |
| *F16H 41/28* | (2006.01) |
| *F16F 15/32* | (2006.01) |
| *F16H 41/04* | (2006.01) |
| *B33Y 10/00* | (2015.01) |

(52) U.S. Cl.
CPC .............. *F16H 41/28* (2013.01); *B33Y 10/00* (2014.12); *F16F 15/32* (2013.01); *F16H 41/04* (2013.01)

(58) Field of Classification Search
CPC ......... B29C 64/00–64/40; B33Y 10/00–99/00; F16F 15/32; F16H 41/28; G01M 1/14; G01M 1/34

USPC ......... 264/40.1, 113, 308, 401, 497; 73/455, 73/460
See application file for complete search history.

(56) References Cited

U.S. PATENT DOCUMENTS

| | | | |
|---|---|---|---|
| 2,701,531 A * | 2/1955 | English | .................. F16H 41/28 416/180 |
| 5,226,807 A | 7/1993 | By et al. | |
| 5,507,622 A * | 4/1996 | Avny | ...................... F16H 41/28 416/180 |
| 5,720,595 A | 2/1998 | Avny | |
| 5,753,274 A | 5/1998 | Wilkening et al. | |
| 6,042,774 A | 3/2000 | Wilkening et al. | |
| 6,428,276 B1 | 8/2002 | Chasseguet et al. | |
| 7,350,352 B2 | 4/2008 | Iwao et al. | |
| 9,144,940 B2 | 9/2015 | Martin | |
| 9,248,611 B2 | 2/2016 | Divine et al. | |
| 9,505,171 B2 | 11/2016 | Meyer | |
| 9,555,475 B2 | 1/2017 | Sidhu et al. | |

(Continued)

OTHER PUBLICATIONS

Kotlinski et al, "Fabrication of Hydrodynamic Torque Converter Impellers by Using the Selective Laser Sintering Method", Rapid Prototyping Journal (2013), pp. 430-436.*

*Primary Examiner* — Leo B Tentoni
(74) *Attorney, Agent, or Firm* — Berenato & White, LLC

(57) ABSTRACT

A turbine wheel for a hydrokinetic torque converter. The turbine wheel is rotatable about a rotational axis and comprises a substantially annular turbine shell member coaxial with the rotational axis, and a plurality of turbine blade members axially extending from the turbine shell member. The turbine wheel is a single-piece component such that the turbine blade members are unitarily formed with the turbine shell member. The turbine wheel (22) is made by an additive manufacturing process from a polymeric material.

14 Claims, 3 Drawing Sheets

(56) References Cited

U.S. PATENT DOCUMENTS

| | | |
|---|---|---|
| 9,597,730 B2 | 3/2017 | Mironets et al. |
| 9,688,021 B2 | 6/2017 | Ravich et al. |
| 9,738,031 B2 | 8/2017 | Mikulak et al. |
| 9,751,260 B2 | 9/2017 | Dietrich et al. |
| 2008/0032083 A1 | 2/2008 | Serdy et al. |
| 2010/0047470 A1 | 2/2010 | Abe et al. |
| 2011/0311389 A1 | 12/2011 | Ryan et al. |
| 2012/0139167 A1 | 6/2012 | Fruth et al. |
| 2013/0171434 A1 | 7/2013 | Hirth et al. |
| 2014/0169971 A1 * | 6/2014 | Vedula ............. B33Y 40/00 416/185 |
| 2018/0051709 A1 * | 2/2018 | Pulnikov ........... B29C 64/153 |

* cited by examiner

000
METHOD FOR MAKING TURBINE WHEEL OF HYDROKINETIC TORQUE CONVERTER

BACKGROUND OF THE INVENTION

1. Field of the Invention

The present invention generally relates to fluid coupling devices, and more particularly to a turbine wheel for hydrokinetic torque converters, and a method for making the same.

2. Background of the Invention

Typically, a hydrokinetic torque converter includes an impeller assembly, a turbine assembly, a stator (or reactor) fixed to a casing of the torque converter, and a one-way clutch for restricting rotational direction of the stator to one direction. The turbine assembly is integrally or operatively connected with a hub linked in rotation to a driven shaft, which is itself linked typically to an input shaft of a transmission of a vehicle. The casing of the torque converter generally includes a front cover and an impeller shell which together define a fluid filled chamber. Impeller blades are fixed to an impeller shell within the fluid filled chamber to define the impeller assembly. The turbine assembly and the stator are also disposed within the chamber, with both the turbine assembly and the stator being relatively rotatable with respect to the front cover and the impeller shell. The turbine assembly includes a turbine shell with a plurality of turbine blades fixed to one side of the turbine shell facing the impeller blades of the impeller.

The turbine assembly works together with the impeller assembly, which is linked in rotation to the casing that is linked in rotation to a driving shaft driven by an internal combustion engine. The stator is interposed axially between the turbine assembly and the impeller assembly, and is mounted so as to rotate on the driven shaft with the interposition of the one-way clutch.

Conventionally, the turbine shell and the turbine blades are typically formed separately by stamping from steel blanks. The turbine shell is typically slotted to receive, through the slots, tabs formed on the turbine blades. After the turbine blades are located within the turbine shell, the tabs are bent or rolled over to form a mechanical attachment on the turbine shell that holds the turbine blades fixed in position.

Current hydrokinetic torque converters and methods for assembly thereof are quite complex, cumbersome and expensive. Therefore, while conventional hydrokinetic torque converters, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a turbine wheel for a hydrokinetic torque converter. The turbine wheel is rotatable about a rotational axis and comprises a substantially annular turbine shell member coaxial with the rotational axis, and a plurality of turbine blade members axially extending from the turbine shell member. The turbine wheel is a single-piece component such that the turbine blade members are unitarily formed with the turbine shell member. The turbine wheel is made of polymeric material.

According to a second aspect of the present invention, there is provided a hydrokinetic torque converter, comprising an impeller wheel rotatable about a rotational axis, and a turbine wheel rotatable about the rotational axis and disposed axially opposite to the impeller wheel. The impeller wheel includes an impeller shell and a plurality of impeller blades outwardly extending from the impeller shell. The turbine wheel is coaxially aligned with and hydrodynamically drivable by the impeller wheel. The turbine wheel comprises a substantially annular turbine shell member coaxial with the rotational axis, and a plurality of turbine blade members axially extending from the turbine shell member. The turbine wheel is a single-piece component, and the turbine blade members are unitarily formed with the turbine shell member. The turbine wheel is made of polymeric material.

According to a third aspect of the present invention, there is provided a method for manufacturing a turbine wheel of a hydrokinetic torque converter. The method comprises the step of forming the turbine wheel by an additive manufacturing process as a single-piece component from a polymeric material. The turbine wheel comprises a substantially annular turbine shell member, and a plurality of turbine blade members unitarily formed with the turbine shell member and axially extending from the turbine shell member.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
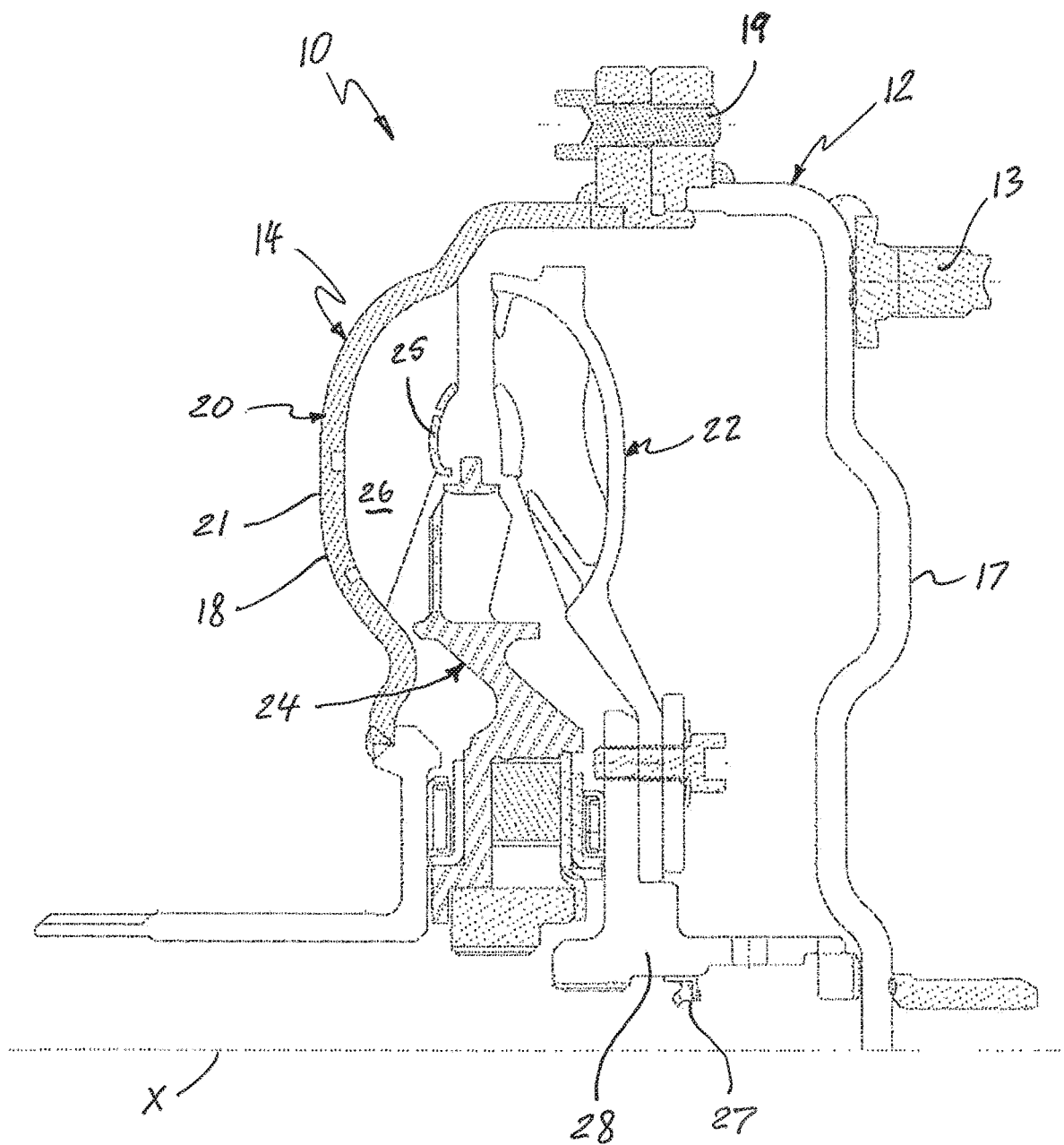
FIG. 1 is a fragmented half-view in axial section of a hydrokinetic torque-coupling device with a turbine wheel in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

An exemplary embodiment of a hydrokinetic torque-coupling device is generally represented in FIG. 1 by reference numeral 10. The hydrokinetic torque-coupling device 10 is intended to couple driving and driven shafts, for example in a motor vehicle. In this case, the driving shaft is an output shaft of an internal combustion engine (not shown) of the motor vehicle and the driven shaft is connected to an automatic transmission (not shown) of the motor vehicle.

The hydrokinetic torque-coupling device 10 comprises a sealed casing 12 filled with a fluid, such as oil or transmission fluid, and rotatable about a rotational axis X of rotation, and a hydrokinetic torque converter 14 disposed in the casing 12. The sealed casing 12 and the torque converter 14 are both rotatable about the rotational axis X. The drawings discussed herein show half-views, that is, a cross-section of the portion or fragment of the hydrokinetic torque-coupling device 10 above rotational axis X. As is known in the art, the torque-coupling device 10 is symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the exemplary embodiment as illustrated in FIG. 1 includes a first casing shell 17, and a second casing shell 18 disposed coaxially with and axially opposite to the first casing shell 17. The first and second casing shells 17, 18 are non-movably (i.e., fixedly) interconnected and sealed together about their outer peripheries, such as by welding or bolts 19 or other mechanical fasteners. The second casing shell 18 is non-movably (i.e., fixedly) connected to the driving shaft, more typically to a flywheel (not shown) that is non-rotatably fixed to the driving shaft, so that the casing 12 turns at the same speed at which the engine operates for transmitting torque. Specifically, in the illustrated embodiment of FIG. 1 the casing 12 is rotatably driven by the internal combustion engine and is non-rotatably coupled to the flywheel thereof, such as with studs 13. As shown in FIG. 1, the studs 13 are fixedly secured, such as by welding, to the first casing shell 17. Each of the first and second casing shells 17, 18 are integral or one-piece and may be made, for example, by press-forming one-piece metal sheets.

The torque converter 14 comprises an impeller wheel (sometimes referred to as the pump or impeller assembly) 20, a turbine wheel (sometimes referred to as the turbine assembly) 22, and a stator (sometimes referred to as the reactor) 24 interposed axially between the impeller wheel 20 and the turbine wheel 22. The impeller wheel 20, the turbine wheel 22, and the stator 24 are coaxially aligned with one another and the rotational axis X. The impeller wheel 20, the turbine wheel 22, and the stator 24 are all rotatable about the rotational axis X. The impeller wheel 20, the turbine wheel 22, and the stator 24 collectively form a torus. The impeller wheel 20 and the turbine wheel 22 may be fluidly coupled to one another in operation as known in the art. The torque-coupling device 10 also includes a substantially annular turbine (or output) hub 28 (as best shown in FIG. 1) rotatable about the rotational axis X, which is arranged to non-rotatably couple together the driven shaft and the turbine wheel 22.

Figure 2:
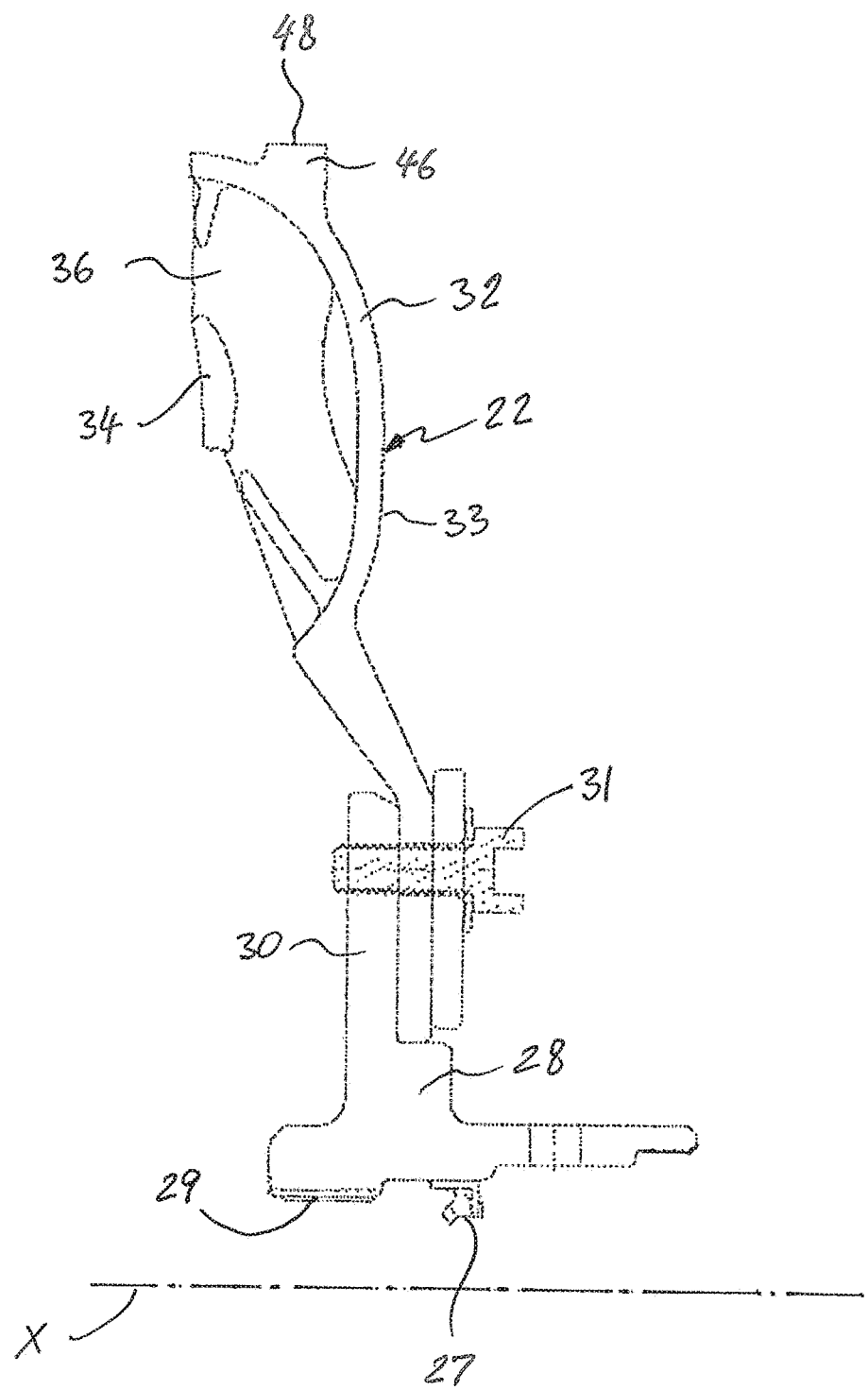
FIG. 2 is a sectional view of a turbine hub secured to the turbine wheel in accordance with the exemplary embodiment of the present invention.

The turbine hub 28 has internal splines 29, as best shown in FIG. 2, and is non-rotatably coupled to the driven shaft, such as an input shaft of the automatic transmission of the motor vehicle, which is provided with complementary external splines. Alternatively, a weld or other connection may be used to fix (i.e., non-movably secure) the turbine hub 28 to the driven shaft. The turbine hub 28 is rotatable about the rotational axis X and is coaxial with the driven shaft to center the turbine wheel 22 on the driven shaft. A sealing member 27 (shown in FIGS. 1 and 2), mounted to a radially inner peripheral surface of the turbine hub 28, creates a seal at the interface of the transmission input shaft and the turbine hub 28.

The impeller wheel 20 includes a substantially annular, semi-toroidal (or concave) impeller shell 21, a substantially annular impeller core ring 25, and a plurality of impeller blades 26 fixedly (i.e., non-moveably) attached, such as by brazing, to the impeller shell 21 and the impeller core ring 25. Thus, a portion of the second casing shell 18 of the casing 12 also forms and serves as the impeller shell 21 of the impeller wheel 20. Accordingly, the impeller shell 21 sometimes is referred to as part of the casing 12. The impeller wheel 20, including the impeller shell 21, the impeller core ring 25 and the impeller blades 26, is non-rotatably secured to the first casing shell 18 and hence to the drive shaft (or flywheel) of the engine to rotate at the same speed as the engine output.

Furthermore, the turbine wheel 22, as best shown in FIG. 2, comprises a substantially annular turbine shell member 32, a substantially annular turbine core ring member 34, and a plurality of turbine blade members 36 axially extending between the turbine shell member 32 and the turbine core ring member 34. The turbine blade members 36 extend axially inwardly from the turbine shell member 32 so as to face the impeller blades 26 of the impeller wheel 20.

The turbine core ring member 34 and the turbine blade members 36 are formed unitary with the turbine shell member 32. Specifically, according to the exemplary embodiment as best shown in FIG. 2, the turbine wheel 22 is manufactured as a single-piece component by an additive manufacturing process. Examples of an additive manufacturing process include selective laser sintering (SLS) (technique that uses a laser as the power source to sinter powdered material (typically nylon/polyamide)), selective laser melting (SLM) (technique that uses a high power-density laser as the power source to melt and fuse material), fused deposition modeling (FDM) (works on an "additive" principle by laying down material in layers), and stereolithography (SLA; also known as stereolithography apparatus, optical fabrication, photo-solidification, or resin printing) which is a form of 3-D printing technology used for creating models, prototypes, patterns, and production parts in a layer by layer fashion using photo-polymerization, a process by which light causes chains of molecules to fuse together from polymers, etc.

Typically, a method of additive manufacturing of a three-dimensional article comprises the steps of sequentially depositing a plurality of successive layers in a configured pattern corresponding to the shape of the article, and selectively sintering or otherwise fusing the deposited material of each layer prior to deposition of the subsequent layer so as to form the article. Thus, each layer is formed by dispensing at least one modeling material to form an uncured layer, and curing/sintering/fusing the uncured layer. Exemplary additive manufacturing processes are disclosed in U.S. Pat. Nos. 9,751,260, 9,738,031, 9,688,021, 9,555,475, 9,505,171, 9,597,730, 9,248,611, 9,144,940, 6,042,774, 5,753,274, and US patent application No. 2013/0171434, 2012/0139167, 2010/0047470, 2008/0032083, the complete disclosures of which are incorporated herein by reference.

According to the exemplary embodiment of the present invention, the turbine wheel 22 is made of polymeric material (or polymer) including technical plastic, such as polyether ether ketone (PEEK), thermoplastic polymer (an organic thermoplastic polymer in the polyaryletherketone (PAEK) family), nylon and carbon fibers (e.g., Carbon Fiber CFF™), and resins, such as PLASTCure Rigid, etc. PEEK polymer, for example, provides fatigue and chemical resistance, can operate at high temperatures and retains outstanding mechanical properties at continuous-use temperatures of up to 240° C. (464° F.), allowing it to replace metal even in the most severe end-use environments of torque converters. Moreover, the technical plastics and resins have a volumetric mass density lower than that of steel.

Accordingly, the additive manufacturing process of making the turbine wheel 22 allows one to optimize the profile and thickness of the turbine shell member 32, the turbine core ring member 34 and/or the turbine blade members 36 for better performance, including hydraulic performance. In other words, the turbine wheel 22 made by the additive manufacturing process from polymeric material can have variations in thickness, and be formed in very particular forms and shapes, including complex shapes not possibly by metal stamping. Also, the turbine assembly can have reinforcing ribs also formed by additive manufacturing. Thus, with the turbine wheel 22 of the present invention there is a possibility for mass optimization by putting the thickness where it is needed for strength and reducing the thickness where it is not needed, such as where stress and deformation are low.

Figure 3:
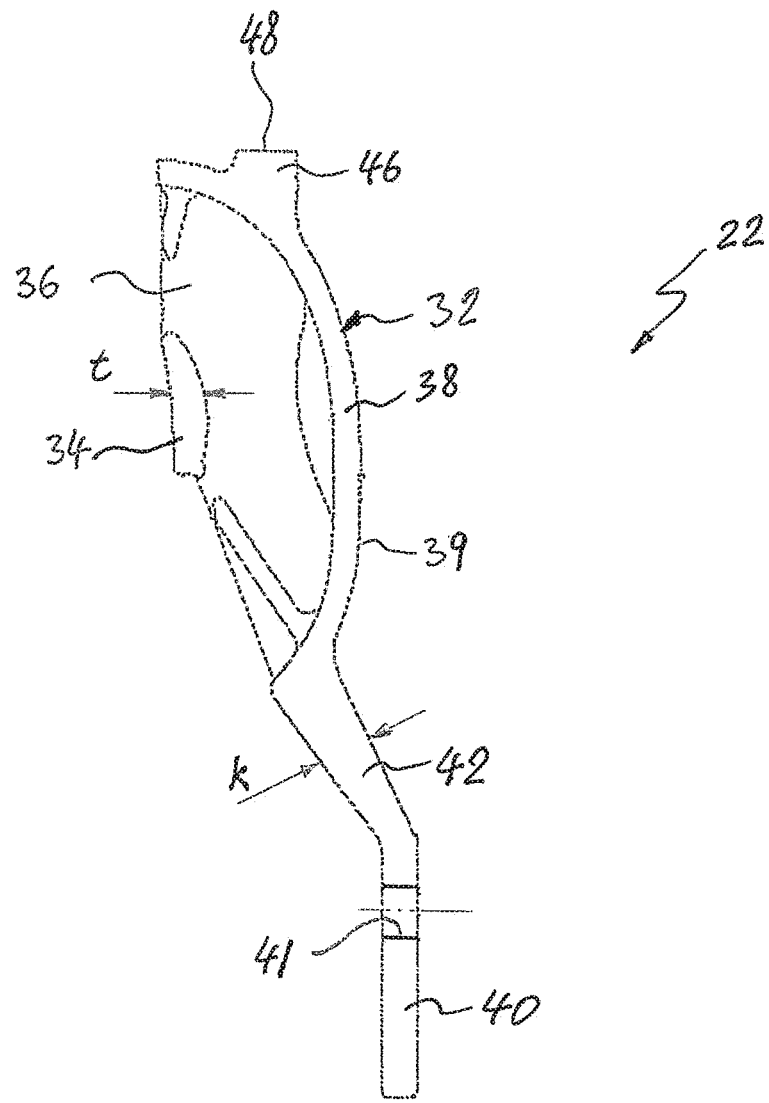
FIG. 3 is a sectional view of the turbine wheel in accordance with the exemplary embodiment of the present invention.

The turbine shell member 32, as best shown in FIG. 3, includes a substantially annular, semi-toroidal (or concave) turbine shell portion 38, a radially extending turbine flange portion 40, and a connecting portion 42 radially extending between the turbine shell portion 38 and the turbine flange portion 40. The turbine shell member 32 of the turbine wheel 22 is non-movably (i.e., fixedly) secured to a hub flange portion 30 of the turbine hub 28 by appropriate means, such as by threaded fasteners 31 or other mechanical fasteners extending through openings 41 in the turbine flange portion 40 (as best shown in FIG. 2), or by welding. The connecting portion 42 of the turbine shell member 32 has a variable thickness k in the direction orthogonal to an axially outer peripheral surface 33 of the turbine shell member 32, as best shown in FIG. 3. Specifically, according to the exemplary embodiment of the present invention, the thickness k of the connecting portion 42 is largest adjacent to the turbine shell portion 38, and smallest adjacent to the turbine flange portion 40. As can be seen, the thickness k varies between shell 38 and turbine flange portion 40 and the additive manufacturing process allows precise control over the thickness variation. Also, the turbine core ring member 34 has a variable thickness t in the direction parallel to the rotational axis X, as best shown in FIG. 3. Specifically, according to the exemplary embodiment of the present invention, the thickness t of the turbine core ring member 34 is largest in a radially middle portion of the turbine core ring member 34, and smallest adjacent to a radially outer end of the turbine core ring member 34.

The turbine wheel 22 made by the above-described additive manufacturing process from polymeric material is usually imbalanced. In order to resolve this problem, the turbine wheel 22 of the exemplary embodiment of the present invention includes a substantially annular balance belt 46 extending outwardly (such as radially outwardly) from an outer peripheral surface 39 of the turbine shell portion 38 of the turbine shell member 32 of the turbine wheel 22, as best shown in FIG. 3. The balance belt 46 is configured for correcting a mass imbalance of the turbine wheel 22. The balance belt 46 of the turbine wheel 22 has a radially outer peripheral surface 48. By machining away material on the radially outer peripheral surface 48 of the balance belt 46, the mass imbalance of the turbine wheel 22 is corrected. In other words, the mass imbalance of the turbine wheel 22 is corrected by removing a portion of the material of the turbine wheel 22 from the balance belt 46.

An exemplary method for assembling the hydrokinetic torque-coupling device 10 according to the exemplary embodiment will now be explained. It should be understood that this exemplary method may be practiced in connection with the other embodiments described herein. This exemplary method is not the exclusive method for assembling the hydrokinetic torque coupling devices described herein. While the method for assembling the hydrokinetic torque-coupling device 10 may be practiced by sequentially performing the steps as set forth below, it should be understood that the methods may involve performing the steps in different sequences.

The impeller wheel 20 and the stator 24 of the torque converter 14 may each be preassembled, as shown in FIG. 1. Next, the turbine wheel 22 is made as a single-piece component from polymeric material, such as plastic, resin, etc, by the additive manufacturing process. The method comprises the steps of sequentially depositing a plurality of successive layers of the polymeric material in a configured pattern corresponding to the shape of the turbine wheel (22) including a substantially annular turbine shell member (32), and a plurality of turbine blade members (36) unitarily formed with the turbine shell member (32) and axially extending from the turbine shell member (32), and selectively sintering or otherwise fusing the deposited material of each layer prior to deposition of the subsequent layer so as to form the turbine wheel (22). The turbine shell member (32) includes the semi-toroidal turbine shell portion (38), a radially extending turbine flange portion (40), and a connecting portion 42 radially extending between the turbine shell portion 38 and the turbine flange portion 40.

The polymeric materials used in making the turbine wheel 22 include technical plastic, such as PEEK, nylon and carbon fibers, and resins, such as PLASTCure Rigid, etc. Moreover, the turbine wheel 22 is manufactured as a single-piece component by the additive manufacturing process, such as through use of SLS, SLM, FDM, SLA, etc. Furthermore, the impeller wheel 20 is unitarily formed with the substantially annular balance belt 46 extending outwardly from the outer peripheral surface 39 of the turbine shell portion 38 of the turbine shell member 32 of the turbine wheel 22, as best shown in FIG. 3.

Next, the turbine wheel 22 is balanced using the method comprising the following steps. First, a magnitude of a mass imbalance of the turbine wheel 22 is determined (or measured), such as by rotation of the turbine wheel 22 to a speed at which the imbalance of the turbine wheel 22 is manifested. Then, material on the radially outer surface 48 of the balance belt 46 is machined away or otherwise removed until the mass imbalance of the turbine wheel 22 is corrected by removing a portion of the material of the turbine wheel 22 from the balance belt 46.

Then, the turbine shell member 32 of the turbine wheel 22 is non-movably (i.e., fixedly) secured to the turbine hub 28 by appropriate means, such as by screws 31 or other mechanical fasteners extending through openings 41 in the turbine flange portion 40 (as best shown in FIG. 2), or by welding.

Next, the impeller wheel 20, the turbine wheel 22 and the stator 24 subassemblies are assembled together so as to form the torque converter 14, as best shown in FIG. 1. After that, the first casing shell 17 is sealingly fixed to the second casing shell 18 of the casing 12, such as by welding or threaded fasteners 19 or other mechanical fasteners, so that the torque converter 14 is sealed within the casing 12, as best shown in FIG. 1.

Various modifications, changes, and alterations may be practiced with the above-described embodiment.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A method for manufacturing a turbine wheel (22) of a hydrokinetic torque converter (14), the method comprising the step of making the turbine wheel (22) by an additive manufacturing process as a single-piece component from a polymeric material;
   the turbine wheel (22) comprising an annular turbine shell member (32), a plurality of turbine blade members (36) unitarily formed with the turbine shell member (32) and axially extending from the turbine shell member (32), and an annular balance belt (46) extending outwardly from the turbine shell member (32) of the turbine wheel (22),
   the annular balance belt (46) configured for correcting mass imbalance of the turbine wheel (22).

2. A method for manufacturing a turbine wheel (22) of a hydrokinetic torque converter (14) by an additive manufacturing process as a single-piece component from a polymeric material, the method comprising the steps of:
   sequentially depositing a plurality of successive layers of the polymeric material in a configured pattern corresponding to the shape of the turbine wheel (22) including an annular turbine shell member (32), and a plurality of turbine blade members (36) unitarily formed with the turbine shell member (32) and axially extending from the turbine shell member (32); and
   selectively fusing each layer prior to deposition of the subsequent layer so as to form the turbine wheel (22);
   the turbine shell member (32) including a semi-toroidal turbine shell portion (38), a radially extending turbine flange portion (40) and an annular balance belt (46) extending outwardly from the turbine shell member (32) of the turbine wheel (22),
   the annular balance belt (46) configured for correcting mass imbalance of the turbine wheel (22).

3. The method as defined in claim 1, further including the steps of:
   determining a magnitude of the mass imbalance of the turbine wheel (22) by rotation of the turbine wheel (22) to a speed in which the imbalance of the turbine wheel (22) is manifested; and
   removing a portion of material of the turbine wheel (22) from the balance belt (46) until the mass imbalance of the turbine wheel (22) is corrected.

4. The method as defined in claim 3, wherein the balance belt (46) of the turbine wheel (22) has an outer peripheral surface (48) configured to be machined away in order to correct mass imbalance of the turbine wheel (22).

5. The method as defined in claim 1, wherein the balance belt (46) extends radially outwardly from the turbine shell member (32) of the turbine wheel (22).

6. The method as defined in claim 5, wherein the balance belt (46) of the turbine wheel (22) has a radially outer peripheral surface (48) configured to be machined away in order to correct the mass imbalance of the turbine wheel (22).

7. The method as defined in claim 1, wherein the turbine shell member (32) includes an annular semi-toroidal turbine shell portion (38), a radially extending turbine flange portion (40), and a connecting portion (42) radically extending between the turbine shell portion (38) and the turbine flange portion (40), and
   wherein the connecting portion (42) of the turbine shell member (32) has a variable thickness.

8. The method as defined in claim 1, wherein the turbine wheel (22) further includes an annular turbine core ring member (34) coaxial with the turbine shell member (32), and wherein at least one of the turbine shell member (32) and the turbine core ring member (34) has a variable thickness.

9. The method as defined in claim 2, further including the steps of:
   determining a magnitude of the mass imbalance of the turbine wheel (22) by rotation of the turbine wheel (22) to a speed in which the imbalance of the turbine wheel (22) is manifested; and removing a portion of material of the turbine wheel (22) from the balance belt (46) until the mass imbalance of the turbine wheel (22) is corrected.

10. The method as defined in claim 9, wherein the balance belt (46) of the turbine wheel (22) has an outer peripheral surface (48) configured to be machined away in order to correct mass imbalance of the turbine wheel (22).

11. The method as defined in claim 2, wherein the balance belt (46) extends radially outwardly from the turbine shell member (32) of the turbine wheel (22).

12. The method as defined in claim 11, wherein the balance belt (46) of the turbine wheel (22) has a radially outer peripheral surface (48) configured to be machined away in order to correct the mass imbalance of the turbine wheel (22).

13. The method as defined in claim 2, wherein the turbine shell member (32) further includes a connecting portion (42) radically extending between the turbine shell portion (38) and the turbine flange portion (40), and wherein the connecting portion (42) of the turbine shell member (32) has a variable thickness.

14. The method as defined in claim 2, wherein the turbine wheel (22) further includes an annular turbine core ring member (34) coaxial with the turbine shell member (32), and wherein at least one of the turbine shell member (32) and the turbine core ring member (34) has a variable thickness.

\* \* \* \* \*